United States Patent [19]

McCausland et al.

[11] Patent Number: 4,609,466

[45] Date of Patent: Sep. 2, 1986

[54] PORTABLE WATER PURIFICATION SYSTEM

[76] Inventors: Calvin W. McCausland, 165 North, 1300 East, Springville, Utah 84663; Louis A. Palombo, 622 North, 300 East, Spanish Fork, Utah 84660

[21] Appl. No.: 663,860

[22] Filed: Oct. 23, 1984

[51] Int. Cl.$^4$ .............................................. B01D 41/00
[52] U.S. Cl. .................................. 210/244; 210/257.2; 210/259; 210/321.1; 210/477
[58] Field of Search ............. 210/244, 473, 477, 321.1, 210/259, 257.1, 257.2

[56] References Cited

U.S. PATENT DOCUMENTS

| | | | |
|---|---|---|---|
| 3,670,892 | 6/1972 | Baerg et al. | 210/321.1 |
| 4,049,550 | 9/1977 | Obidniak | 210/321.1 |
| 4,193,872 | 3/1980 | Parkinson | 210/321.1 |

*Primary Examiner*—Frank Sever
*Attorney, Agent, or Firm*—Hubbard, Thurman, Turner, & Tucker

[57] ABSTRACT

A portable water purification system includes a generally rectangular boxlike chest containing a particulate matter prefilter, a reverse osmosis filter and an activated carbon postfilter unit disposed in a lower base part of the chest. The prefilter, reverse osmosis filter and postfilter units are connected in series by flexible conduits. The chest includes a removable tray section provided with receptacles for receiving a plurality of connector assemblies, a raw water diverter valve, and flexible conduits interconnecting the filter units with the raw water source, a waste water discharge line and connector assemblies for serially connecting a plurality of pure water storage containers comprising conventional plastic milk jug type containers.

16 Claims, 7 Drawing Figures

PORTABLE WATER PURIFICATION SYSTEM

BACKGROUND OF THE INVENTION

Field of the Invention

The present invention pertains to a portable water purification system particularly adapted for use on a domestic sink or countertop and to be connected to a domestic water supply for providing purified drinking water utilizing a reverse osmosis filter unit and a plurality of series connected purified water storage containers.

Background

In a great many geographical areas domestic water supplies are of questionable purity. The demands on some centralized water filtration systems and the utilization of certain ground and surface water resources makes it virtually impossible from an economic viewpoint to provide drinking water of a purity required or at least desired for human consumption. Accordingly, there has been a continuing need for a water filter system which may be readily adapted for use as a domestic appliance for connection to domestic water supplies which are often considered to be suitable for use for potable water but which in reality are dangerously toxic. In such situations and in regard to many other water supplies, the degree of purity of water from the central supply system or a private well is such that water for human internal consumption requires additional purification. In this regard there has been a longfelt need for a water purification system which is easily utilized in conjunction with a household water distribution system, which may be used only when it is necessary to provide a supply of drinking water, and may otherwise be easily stored out of the way. The present invention provides a unique portable water purification system particularly adapted for use as a domestic appliance which holds several advantages and superior features which will be appreciated by those skilled in the art upon reading the following description.

SUMMARY OF THE INVENTION

The present invention provides a portable water purification system particularly adapted for use in supplying purified drinking water for human internal consumption and which is particularly adapted for use as a kitchen appliance for connection to a kitchen sink faucet or the like for supplying a predetermined quantity of drinking water in one or more portable storage containers.

In accordance with an important aspect of the present invention there is provided a portable water purification system characterized by a reverse osmosis filter unit, a solids filter unit interposed in a raw water inlet conduit leading to the reverse osmosis filter unit, an adsorbent type filter unit interposed in a pure water outlet conduit leading from the reverse osmosis filter unit and connector means for connecting a source of raw water to the filter system and for connecting the purification system to pure water storage containers. The filter units are all conveniently supported in a portable chest which also includes a support tray for storing flexible conduits leading to and from the filter units, the raw water faucet connector and a plurality of connectors for serially connecting one or more storage containers to the pure water outlet conduit.

In accordance with another aspect of the present invention the portable filter unit includes a storage chest having means for receiving and supporting a plurality of flexible hoses or conduits including a raw water inlet conduit to the water filter system, a pure water outlet conduit for connection to storage containers and a waste water outlet conduit for discharging waste water to a drain conduit or the like. The portable storage chest includes a hinged closure or cover and a support tray mounted in the chest and forming a closure for means in the chest supporting plural filter units. The support tray is particularly adapted for housing plural lengths of flexible conduits and fittings for connecting the conduits to respective raw water sources, waste water receiving means, and pure water storage containers.

In accordance with yet a further aspect of the present invention there is provided a portable water purification system particularly adapted for providing a quantity of purified drinking quality water to be stored in a plurality of portable containers such as one gallon milk containers or the like wherein a plurality of multipart connectors are provided which are particularly adapted for connection to the containers and for interconnecting the containers seriatim to be fitted with purified water from the purification system.

Those skilled in the art will further appreciate the abovedescribed advantages and superior aspects of the invention as well as additional features thereof upon reading the detailed description which follows in conjunction with the drawing.

DESCRIPTION OF THE PREFERRED EMBODIMENT

Figure 1:
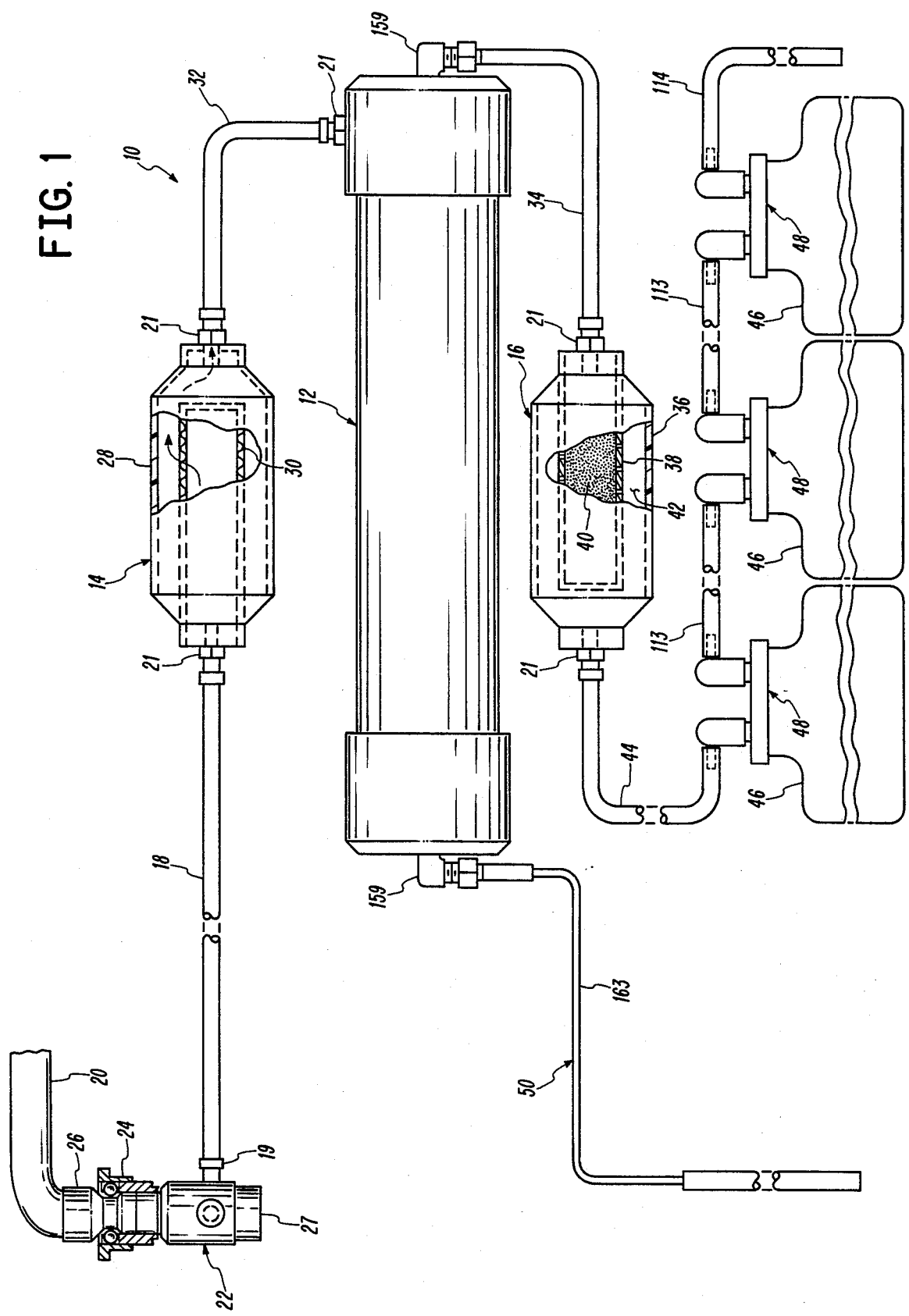
FIG. 1 is a schematic diagram of the water handling working components of the water purification system of the present invention.

In the description which follows like parts are marked throughout the specification and drawing with the same reference numerals, respectively. The drawing figures are not necessarily to scale and certain features of the invention may be shown exaggerated in scale or in somewhat schematic form in the interest of clarity.

Referring to FIG. 1, there is illustrated in somewhat schematic form working components of a water purification system in accordance with the present invenion, which system is generally designated by the numeral 10. The water purification system 10 comprises a reverse osmosis type primary filter unit 12, a solids prefilter unit 14 and an adsorbent type secondary filter unit 16. The water purification system 10 is particularly adapted for receiving raw inlet water to the prefilter 14 by way of a flexible conduit 18 which is connected between the prefilter 14 and a source of raw water such as a kitchen faucet 20 by way of a diverter valve assembly 22. The diverter valve assembly 22 may be of conventional construction and includes a conventional quick disconnect fitting 24 which is operable to be coupled to a faucet adapter member 26. Raw water may be discharged through the diverter valve assembly 22 at a faucet outlet nozzle 27 or diverted through conduit 18 to the water purification system 10.

The prefilter unit 14 is characterized by a generally cylindrical closed container 28 in which is disposed a barrier type filter unit 30 for filtering solid particles out of the water flowing through the prefilter unit 14. A prefilter unit discharge conduit 32 interconnects the prefilter unit with the reverse osmosis filter unit 12. The conduits 18 and 32 are connected to the respective components indicated by suitable connectors 19 and 21 of a conventional type for use with flexible pressure tubing. Substantially pure water is discharged from the reverse osmosis filter unit 12 by way of a pure water conduit 34 which is connected to the adsorbent type secondary filter unit 16. The secondary filter unit 16 includes a housing 36 in which is disposed a foraminous support member 38 packed with an adsorbent type filtration media 40, such as activated carbon or charcoal. Water entering the filter unit 16 flows through the filter media 40 and generally radially outwardly through the foraminous support member 38 into an annular chamber 42 and is conducted from the housing 36 through a pure water discharge conduit 44. The pure water discharge conduit 44 is connected to a plurality of pure water storage containers 46 which are connected seriatim by a plurality of unique connector assemblies 48 to be described in further detail herein. Waste water from the reverse osmosis filter unit 12 is conducted by way of a flexible conduit assembly 50 to a suitable waste water discharge point, not shown in FIG. 1.

Figure 2:
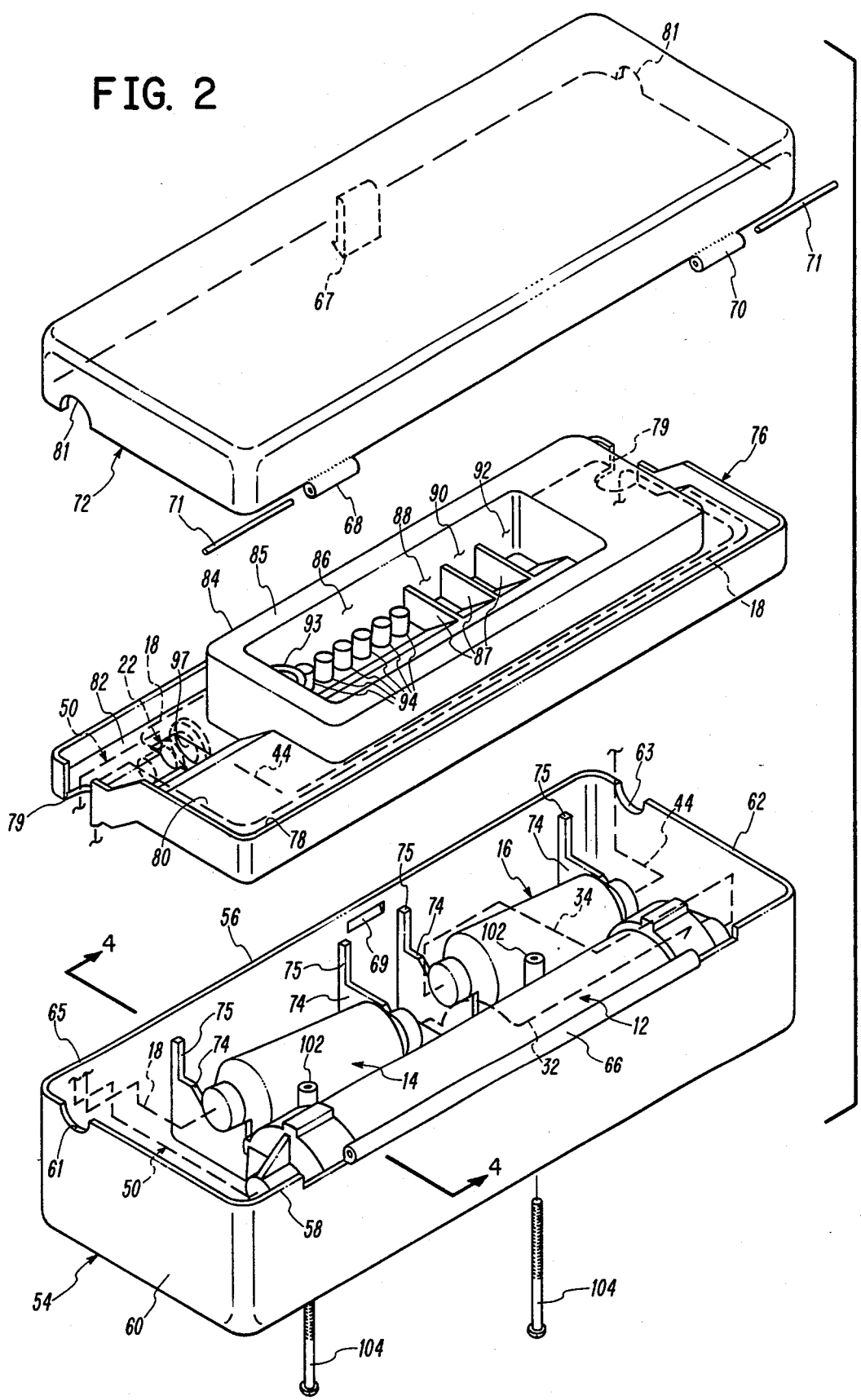
FIG. 2 is an exploded perspective view of the support tray and storage chest.
Figure 4:
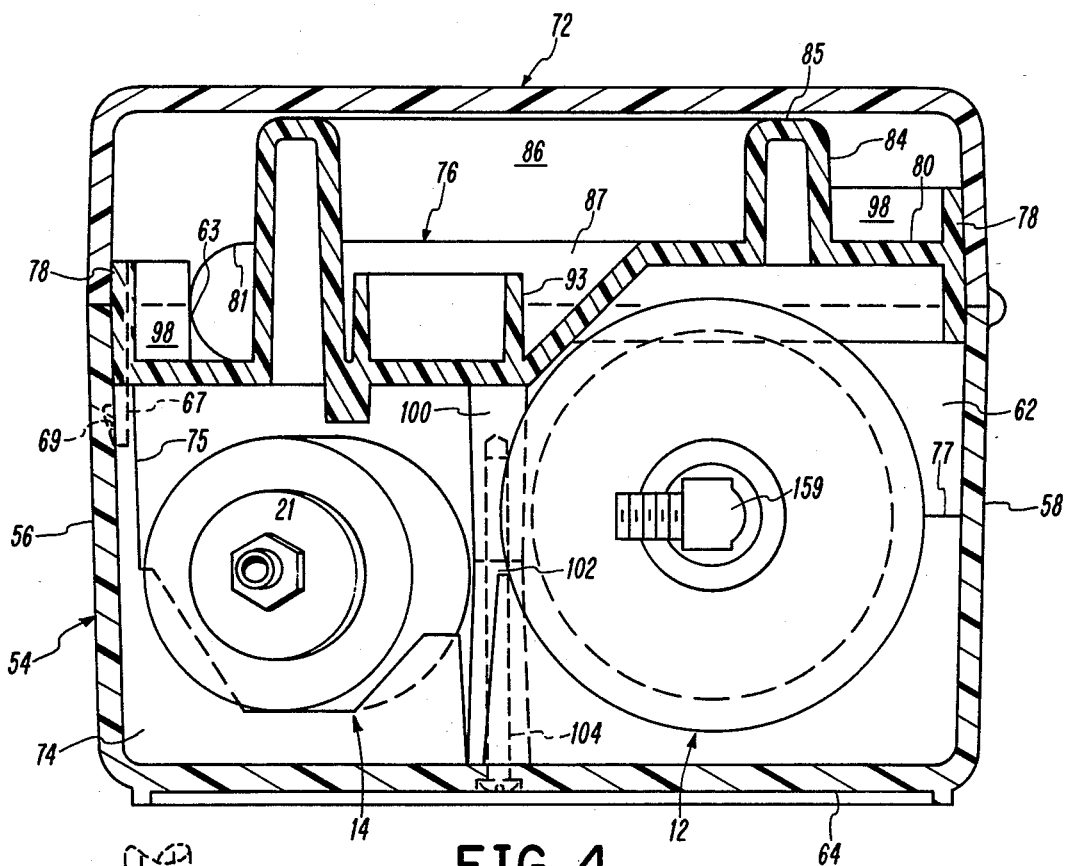
FIG. 4 is a transverse section view taken along the line 4—4 of FIG. 2 with the chest and tray in their assembled relationship.

Referring now to FIGS. 2 and 4, the filter system 10 also includes a unique support container or chest which, in conjunction with the arrangement of the raw water inlet conduit, pure water discharge conduit, and waste water conduit provides for a compact unit which is easily situated on a countertop or drainboard adjacent to a conventional sink faucet such as the faucet 20. The filter system 10 includes a support chest for the filter units 12, 14 and 16 comprising a generally rectangular elongated box shaped base part 54 having opposed longitudinal sidewalls 56 and 58, endwalls 60 and 62 and a bottom wall 64, FIG. 4. The base part 54 is provided with generally arcuate recesses or openings 61 and 63 in the respective endwalls 60 and 62 which intersect an upper peripheral rim 65. The base part 54 also includes a hinge bearing 66 cooperable with spaced apart hinge bearings 68 and 70 on a cover member 72 whereby the cover member 72 may be hingedly secured to the base part 54 by hinge pins 71. The cover member 72 is provided with a deflectable closure pawl 67 which is engageable with a cooperating notch 69 in sidewall 56 of the base part 54 for securing the cover 72 in a closed position.

The base part 54 includes spaced apart integral support members 74, FIG. 2, forming respective cradles for the filter units 14 and 16. Similar cradle type supports 77, one shown in FIG. 4, are provided for supporting the filter unit 12 in the base part 54. The support members 74 include upstanding column portions 75 which support a removable tray member 76 which is adapted to nest within the envelope formed by the sidewalls 56, 58 and endwalls 60 and 62. The tray member 76 includes a peripheral rim 78 and a stepped floor formed by floor portions 80 and 82. The tray member 76 also includes an integral boss 84 of generally rectangular configuration projecting upward from the floor portions 80 and 82 and defining a receptacle 86 divided into open topped compartments 88, 90 and 92 for storage of respective cap portions of the connector assemblies 48. The receptacle 86 also includes a plurality of integral upstanding posts 94 adapted to support additional portions of the connector assemblies 48 comprising conduit connector members 49, FIG. 1. The receptacle 86 also includes a cylindrical support collar 93 for receiving and supporting the adaptor 26 when it is removed from the faucet 20. The floor portion 82 also includes an integrally molded or formed recess 97 for receiving the diverter valve assembly 22 including the quick disconnect coupler section 24.

Accordingly, the boss 84 together with the peripheral rim 78 defines a generally annular or perimeter type channel 9, FIG. 4, extending entirely around the boss 84 and between the sidewall portions and endwall portions of the rim 78 whereby the flexible conduits 18, 44, and 50 may be laid on the floor 80, 82 of the tray member 76 and in a loosely coiled fashion around the boss 84 as required, and as indicated by the dashed lines in FIG. 2 showing the alternate position of these conduits when the water purification system is not in use and is to be stored within the chest 54 itself.

Figure 3:
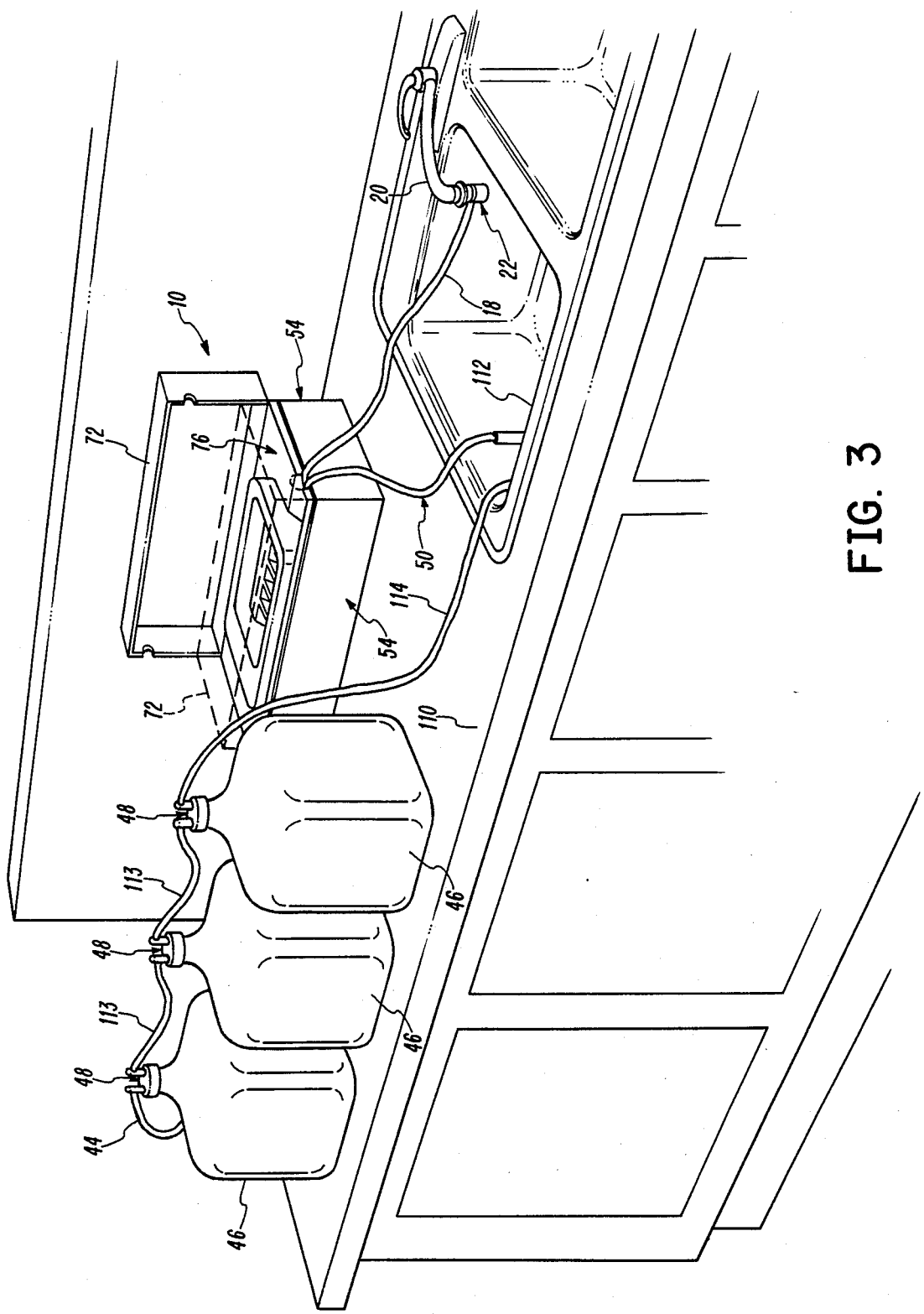
FIG. 3 is a perspective view of the water purification system in use.

The tray member 76 is also provided with two spaced apart depending bosses 100, one shown in FIG. 4, cooperable with upstanding support bosses 102, one shown in FIG. 4 and both shown in FIG. 2, which, together with the column portions 75, support the tray member 76 within the base part 54, as indicated in FIGS. 3 and 4. Suitable threaded fasteners 104, one shown in FIG. 4, extend through cooperable bores in the bosses 102 and are threaded into engagement with the bosses 100 to secure the tray member 76 in the position shown in FIGS. 3 and 4. Moreover, with the tray member 76 in its assembled position shown in FIG. 4, the filter units 12, 14 and 16 are secured against dislodgement from the respective cradle supports. Accordingly, when the cover 72 is assembled to the base part 54 and hinged thereto the top wall 73 of the cover 72, in the closed position thereof, fits closely adjacent to the upper peripheral rim 85 of the boss 84 to prevent substantial movement or dislodgement of components disposed within the receptacle 86 or the peripheral channel 98. As shown in FIG. 2, the tray member 76 also includes opposed generally arcuate recesses 79 which are adapted to be aligned with the recesses 61 and 63, respectively, when the tray 76 is assembled with the base part 54 and the cover 72 has similar aligned recesses 81. In this way, the conduits 18, 50 and 44 may extend from the chest with the cover in the closed position as indicated by the alternate position of the cover in FIG. 3.

Thanks to the arrangement of the filter units 12, 14 and 16 and the provision of the flexible conduits 18, 44 and 50 the water purification system 10 may be easily set on a kitchen countertop 110, FIG. 3, for example, and connected to a faucet 20 for a sink 112. Moreover, the provision of the diverter valve 22 does not require dedication of the faucet 20 to use with the water purification system 10, exclusively. A particular advantage of the present invention resides in the provision of the connector assemblies 48 and interconnecting sections of flexible conduits 113 and 114, FIGS. 1, 2 and 3, whereby a plurality of containers 46 may be connected seriatim for receiving purified water without changing the position of the conduit 44 or contaminating the containers. As each container 46 is filled with pure water the next container in the series is filled until water overflows the last container in the series through the conduit section 14. The flexible conduits 18, 32 and 50 are preferably of reinforced plastic and the conduits 34, 44, 113 and 114 may be provided of relatively soft plastic pressure tubing of the type made under the trademark TYGON. The conduits are preferably color coded to indicate which conduits are raw water inlet, waste water outlet and pure water conduits. The conduit sections 113 and 114 may also be disposed in the channel 98 when the system is stored.

Figure 5:
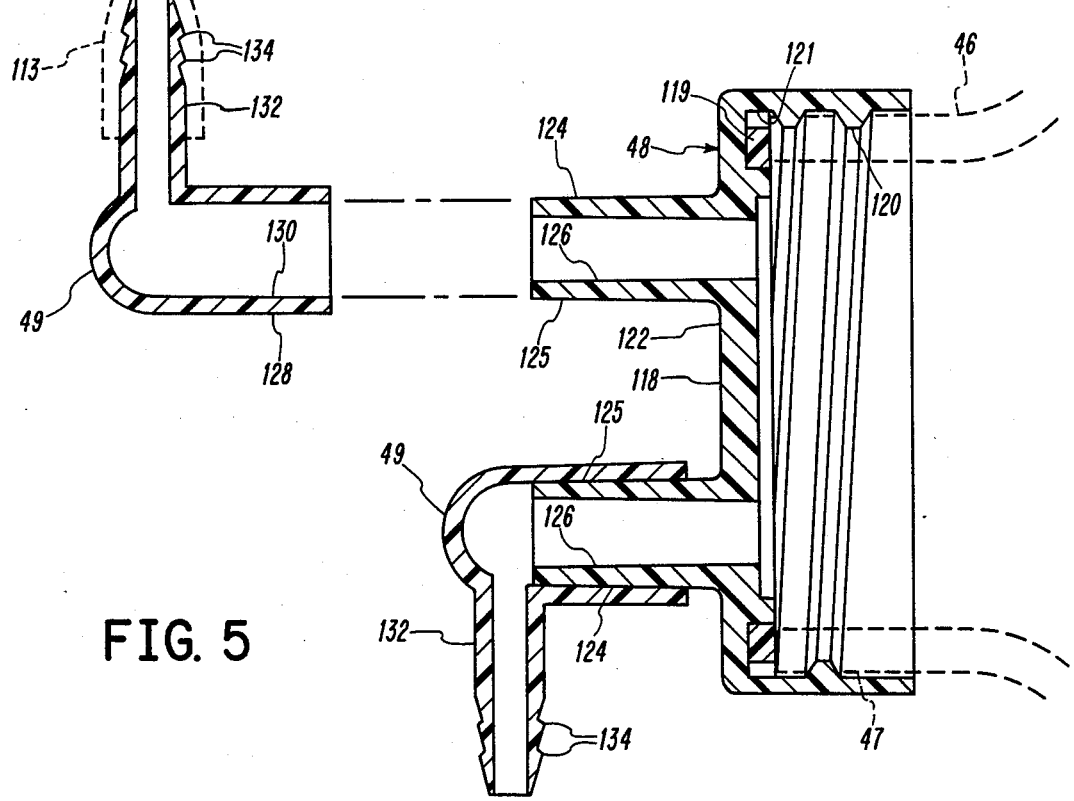
FIG. 5 is an exploded section view of one of the connector assemblies for the pure water storage containers.

Referring now to FIG. 5, the connector assemblies 44 each comprise a generally cylindrical cap member 118 having internal threads 120 which are of standard form to provide for threaded engagement of the cap member with a conventional one gallon milk container or the like. The cap member 118 includes a top wall 122 from which project two spaced apart spigot portions 124. The spigot portions 124 have a somewhat conical tapered outer wall surface 125 and an internal passage 126. The connector members 49 each include a body 128 having a conical bore forming an internal passage 130 dimensioned to conform to the taper of the surfaces 125 so that the connector body 128 may be slipped over the spigot portions 124 and forcibly engaged therewith. The connector members 49 also include a laterally projecting cylindrical fitting portion 132 having a plurality of circumferentially extending axially spaced apart barbs 134 to provide for forcible insertion within the bore of the tube sections 44, 113 or 114. The connector assemblies 48 are particularly versatile in that cap members 118 may be threaded on or snapped over the neck 47 of a container 46 and the connector members 49 may be forcibly inserted on the spigot portions 124 and rotated to a convenient position so that the containers 46 may be oriented relative to each other in a desired manner and interconnected by the conduits 113. When the connector assemblies 48 are not in use, the caps 118 may be stored in the receptacle portions 88, 90, and 92 and the connector members 49 may be supported on the bosses 94 in the tray member 76. The cap member 118 also includes a resilient gasket member 119 disposed in an undercut groove 121 for sealing engagement with the top edge of the neck 47.

Figure 6:
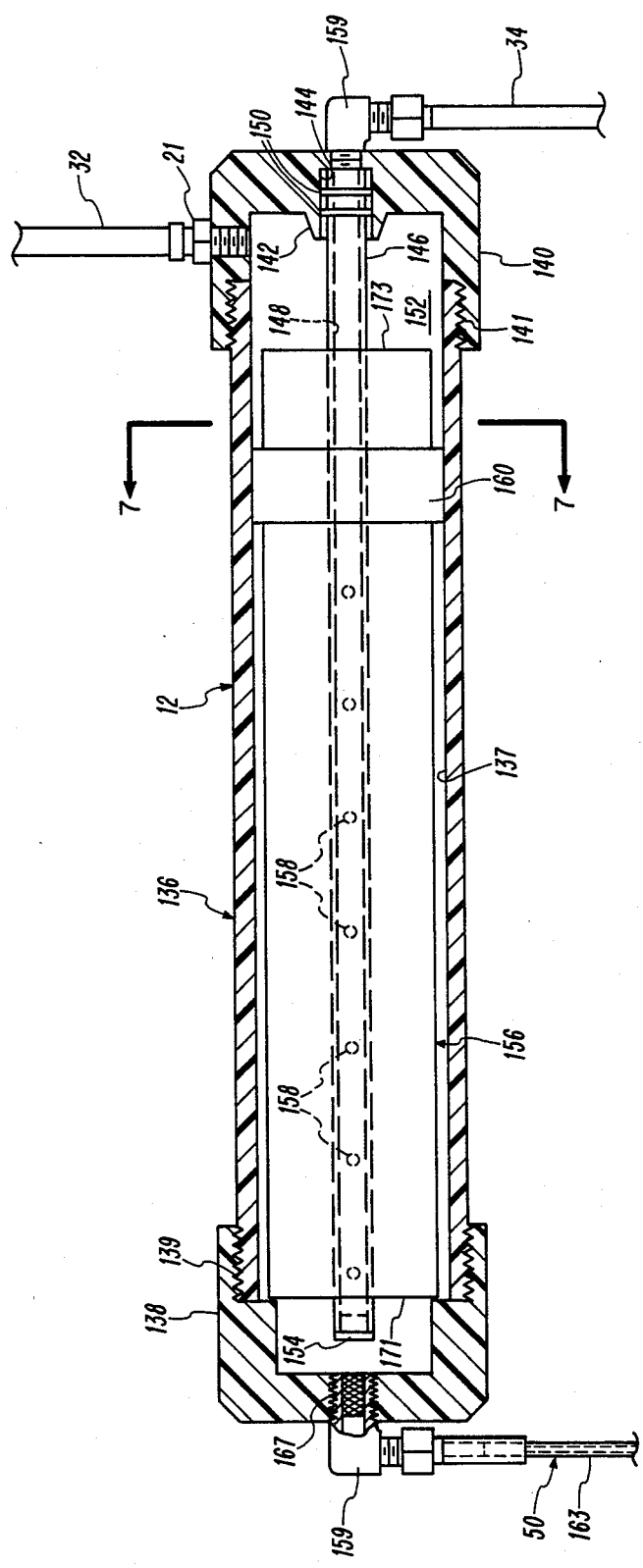
FIG. 6 is a longitudinal central section view of the reverse osmosis filter unit and pressure vessel.
Figure 7:
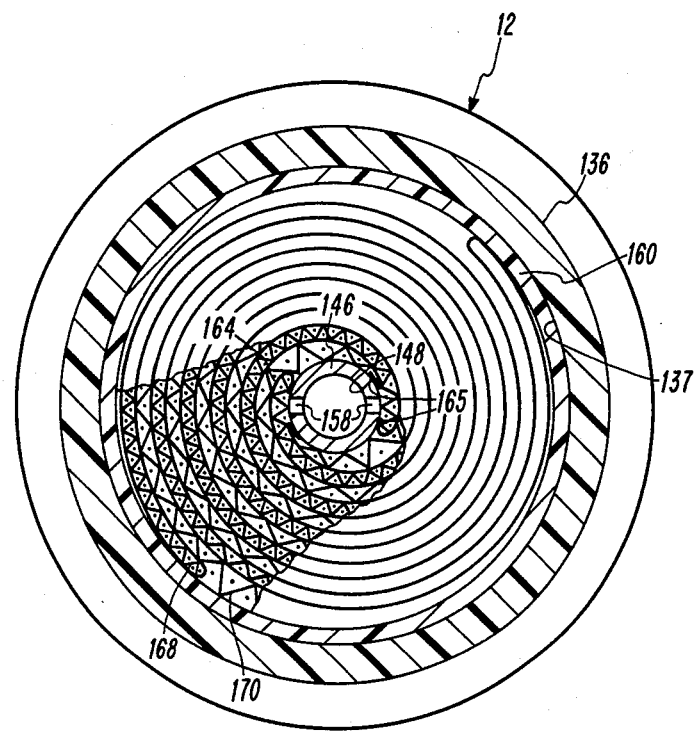
FIG. 7 is a section view taken generally along the line 7—7 of FIG. 6.

Referring now to FIGS. 6 and 7, the filter unit 12 is charcterized by an elongated cylindrical housing 136 having removable opposed end cap members 138 and 140. The end caps 138 and 140 are suitable secured in sealed engagement with the housing 136 such as by cooperating threaded connections 139 and 141, respectively. The end cap 140 includes an interior axially projecting boss 142 defining a cylindrical bore 144 adapted to support one end of an elongated cylindrical tube member 146 having an interior passageway 148 formed therein. The tube member 146 is fitted with generally cylindrical annular seal members 150 such as conventional O-rings and the tube end including the O-rings 150 may be inserted in the bore 144 whereby the O-rings 150 provide a seal to prevent water entering the interior chamber 152 by way of the conduit 32 from flowing directly to the conduit 34.

The tube 146 is closed at its opposite end by a plug 154. The plug 154 is preferably secured in the end of tube 146 by adhesive bonding after machining the tube bore to a predetermined size. The tube 146 is also secured to a reverse osmosis filter membrane structure, generally designated by the numeral 156, whereby raw tap water entering the chamber 152 is forced through the filter membrane structure 156 into spaced apart ports 158 in the tube 146 so that purified water permeating through the membrane structure will flow through the passage 148 and out of the filter unit 12 through the conduit 34. The conduit 34 is suitably connected to the cap 140 by a conventional tube fitting 159. Raw inlet water entering chamber 152 from the conduit 32 is prevented from bypassing the filter membrane structure 156 by an annular ring type seal member 160 disposed around the membrane structure and is sealingly engaged with the inner bore wall 137 of the housing member 136. Water which does not flow through the reverse osmosis filter membrane structure 156 exits the filter unit 12 through a fitting 159 threaded into the cap 138 and which is connected to the waste water conduit assembly 50. The waste water conduit assembly 50 includes a flow restricting tube 163 which is of relatively small diameter and of a predetermined length so as to present a flow resistance or back pressure within the chamber 152 to force water entering the chamber 152 to flow through the membrane structure 156 into the passage 148. It has been determined that the minimum flow passage diameter for the restrictor tube 163 should be about 0.030 inches to prevent being clogged by particulate matter. A nylon mesh filter 167 is preferably disposed in the fitting 159, as shown in FIG. 6, or otherwise interposed in the waste water flow path upstream of the restrictor tube 163 to prevent solids from clogging the restrictor tube orifice. The restrictor tube 163 is arranged in the length of conduit assembly 50 to remain in the chest when the conduit assembly 50 is in use.

Referring briefly to FIG. 7, and by way of example, the membrane structure 156 may be characterized by at least a pair of permeable membranes 164 which are suitably secured at their opposite ends 165 to the exterior surface of the tube 146 on opposite sides of the ports 158. The membranes 164 are held in spaced relationship by suitable mesh members 168 and 170. The mesh members 170 are in communication with the chamber 152 at opposite ends 171 and 173 of the membrane structure 156. However, the space occupied between the membranes 164 by the mesh 168 is closed at the opposite ends 171 and 173 of the membrane structure 156 whereby water entering the chamber 152 may flow along the spiral spaces occupied by the mesh 170, permeate through the membranes 164 into the spaces occupied by the mesh 168 and flow along a spiral path until it enters the ports 158 and the passage 148. The membrane structure 156 is primarily exemplary and may take other forms.

The operation of the water purification system 10 is believed to be readily understandable from the foregoing description of the system. However, those skilled in the art will appreciate that the provision of a system comprising a particulate matter prefilter such as the filter unit 14, a reverse osmosis type filter unit 12 and an activated carbon or charcoal filter unit 16, connected in series, provides a particularly superior filter or purification system. In particular, the reverse osmosis/carbon filter combination removes bacteria and other organisms, and at least 85% and 90%, respectively, of dissolved nitrates and sodium as well as the removal of heavy metals, halogen compounds and dissolved salts. The system is not an energy consumer. A unit capable of providing about 19 gallons per day at 110 psi raw water pressure requires a countertop space for the storage chest of a approximately 6 inches by 15 inches by 5 inches height. The chest base part 54, the tray 76 and the cover 72 may be conveniently molded of high impact resistant plastic as may the containers for filter units 12, 14 and 16, and the parts of the connector assemblies 48.

Although a preferred embodiment of the present invention has been described herein in detail those skilled in the art will recognize that various substitutions and modifications may be made to the specific structural elements described without departing from the scope and spirit of the invention as recited in the appended claims.

What we claim is:

1. A portable water purification system usable as a domestic appliance comprising:
    means designed for staged purification of raw tap water to a potable pure condition, including:
    a plurality of flow connected water filter units arranged for seriatim removal of different impurities contained in raw water to be purified, said filter units including:
    a primary water filter unit having a pressure vessel, means forming a reverse osmosis filter structure in said pressure vessel, a raw water inlet conduit, a pure water outlet conduit and a waste water outlet conduit connected to said pressure vessel, respectively; and
    a secondary water filter unit operationally adapted for solids removal;
    raw water connector means for detachable connection to a raw water faucet, and flexible raw water conduit means for conducting raw water from said raw water connector means to said filter units;
    pure water connector means defining a closed system for connection to a pure water storage container, and flexible pure water conduit means interconnecting said pure water connector means with an outlet from said filter units; and
    portable storage chest means for containing said filter units, said flexible conduit means and said connector means for storage of said system upon disconnection of said conduit means from said faucet and said storage container, respectively.

2. The water purification system set forth in claim 1 wherein:
    said storage chest means comprises a boxlike base part including means for supporting said filter units, respectively, enclosed in said base part, said base part having a peripheral rim;
    a tray member disposed adjacent to said rim and supported by said base part to form a closure over said filter units;
    said tray member including means for storing said connector means and said flexible conduit means; and
    a cover member forming a closure over tray member and being movable between open and closed positions with respect to said base part.

3. The water purification system set forth in claim 2 wherein:
    said tray member includes a floor and means forming an upstanding boss projecting from said floor to define, in part, a perimeter channel for receiving said flexible conduit means.

4. The water purification system set forth in claim 3 wherein:
    said boss includes receptacle means for receiving and storing said pure water connector means on said tray member.

5. The water purification system set forth in claim 3 wherein:
    said tray member includes recess means for receiving and supporting said raw water connector means.

6. The water purification system set forth in claim 5 wherein:
    said tray member comprises a peripheral upstanding flange defining in part said perimeter channel.

7. The water purification system set forth in claim 2 including:
    recess means formed in said chest and providing an opening through which said flexible conduit means may be trained when said cover is disposed over said tray member.

8. The water purification system set forth in claim 7 wherein:
    said tray member includes means registering with said recess means in said chest to provide for training said flexible conduit means along said channel and within said chest with said cover closed over said tray member.

9. The water purification system set forth in claim 1 wherein:
    said pure water connector means include a plurality of connectors, each including a cap member for releasably securing said connector to a pure water storage container, means forming a water inlet passage and means forming a water outlet passage, and flexible conduit connector members for connecting said pure water connectors to said pure water flexible conduit means and to at least a second pure water storage container seriatim.

10. The water purification system set forth in claim 9 wherein:
    said means forming said water inlet and outlet passages comprise respective spigot portions of said cap member, said spigot portions having conical tapered surfaces engageable with conical tapered bores in said flexible conduit connector members for receiving said spigot portions in force fitted sealed engagement whereby said connector members may be selectively pushed on and pulled off said cap member and rotataby positioned relative to said cap member.

11. A portable water purification system comprising:
    means designed for staged purification of raw tap water to a potable pure condition, including:
    a plurality of flow connected water filter units arranged for seriatim removal of different impurities contained in raw water to be purified, said filter units including:
    a primary filter unit comprising a closed pressure vessel, raw water inlet conduit means, pure water outlet conduit means and waste water outlet conduit means connected to said pressure vessel, respectively;
    a raw water connector for connecting a source of raw water to said primary filter unit through said inlet conduit means;
    a solids type secondary filter unit interposed in said raw water inlet conduit means; and
    an adsorbent type secondary filter unit interposed in said pure water outlet conduit means;

a plurality of container connectors for serially connecting a plurality of storage containers to said pure water outlet conduit for filling said containers in series in a closed system without disconnecting said pure water outlet conduit from any one of said containers; and portable storage chest means for containing said filter units, said connectors and said conduit means when stored.

12. The water purification system set forth in claim 11 wherein:

said container connectors each include a cap member for releasably securing said container connector to a pure water storage container, means forming respective pure water inlet and outlet passages comprising respective spigot portions of said cap member, said spigot portions having conical tapered surfaces, and conduit connector members for connecting said pure water connectors to said pure water flexible conduit means and having conical tapered bores for receiving said spigot portions in force fitted sealed engagement whereby said connector members may be selectively pushed on and pulled off said cap members and rotataby positioned relative to said cap members for interconnecting a plurality of containers seriatim for receiving pure water from said filter units.

13. The water purification system set forth in claim 12 including:

flexible pure water conduit sections for connection to said pure water connectors seriatim to transfer pure water from one container to another and to an overflow discharge point from the last container in series with said pure water containers.

14. A countertop water purification system comprising:

means designed for purification of raw tap water to a potable pure condition, including:

an elongated boxlike support chest having a base part including means for supporting at least one filter unit;

a filter unit including a housing supported in said base part;

a raw water inlet conduit, a pure water outlet conduit and a waste water outlet conduit connected to said filter unit, respectively;

a quick release connector assembly connected to one end of said raw water inlet conduit for connecting said filter unit to a source of raw water;

at least one releasable pure water connector assembly defining a closed system for connecting said pure water outlet conduit to a storage container for conducting pure water thereto;

a support tray having means thereon for receiving and supporting said conduits and said connector assemblies, said support tray being disposed on said base part and forming a closure for said base part for enclosing said filter unit; and a cover member removably disposed over said support tray for enclosing said support tray.

15. The water purification system set forth in claim 14 including:

an overflow conduit connected to said pure water connector assembly for conducting pure water overflow to a discharge point when said storage container becomes full.

16. The water purification system set forth in claim 14 wherein:

said filter unit includes a housing, a reverse osmosis membrane structure disposed in said housing and connected to a pure water discharge tube for conducting pure water to said pure water outlet conduit; and a waste water outlet conduit connected to said housing for receiving waste water which has not permeated said membrane structure, said waste water conduit comprising an elongated flow restrictor tube for providing a back pressure in said housing sufficient to force raw water to permeate said membrane structure.

* * * * *

UNITED STATES PATENT AND TRADEMARK OFFICE
CERTIFICATE OF CORRECTION

PATENT NO. : 4,609,466

DATED : September 2, 1986

INVENTOR(S) : Calvin W. McCausland and Louis A. Palombo

It is certified that error appears in the above-identified patent and that said Letters Patent is hereby corrected as shown below:

Col. 2, line 60, "present invenion," should be --present invention,--

Col. 4, line 20, "channel 9," should be --channel 98,--.

Signed and Sealed this

Twenty-fifth Day of November, 1986

*Attest:*

DONALD J. QUIGG

*Attesting Officer*      *Commissioner of Patents and Trademarks*

UNITED STATES PATENT AND TRADEMARK OFFICE
CERTIFICATE OF CORRECTION

PATENT NO. : 4,609,466

DATED : September 2, 1986

INVENTOR(S) : Calvin W. McCausland and Louis A. Palombo

It is certified that error appears in the above-identified patent and that said Letters Patent is hereby corrected as shown below:

On the title page insert

--(73)Assignee:  Nature's Sunshine Products, Inc.
Spanish Fork, Utah --.

Signed and Sealed this

Seventeenth Day of February, 1987

Attest:

DONALD J. QUIGG

Attesting Officer

Commissioner of Patents and Trademarks